United States Patent Office 3,313,762
Patented Apr. 11, 1967

3,313,762
ORGANOPOLYSILOXANE ELASTOMERS CONTAINING PEROXY CARBONATE CURING AGENTS
Charles W. Pfeifer, Schenectady, N.Y., assignor to General Electric Company, a corporation of New York
No Drawing. Filed Aug. 29, 1963, Ser. No. 305,534
5 Claims. (Cl. 260—37)

The present invention relates to organopolysiloxane compositions convertible to the cured, solid, elastic state and to the elastomers produced therefrom. More particularly, the present invention relates to the employment of a tertiary-alkylperoxyalkylcarbonate as a curing agent for organopolysiloxane compositions convertible to the cured, solid, elastic state.

Molded organopolysiloxane elastomers have been employed in a variety of applications requiring materials with a high degree of toughness, and an ability to resist permanent deformation resulting from compression at elevated temperatures over an extended period of time. One of the principal factors determining the performance of such organopolysiloxane products, which can be molded in the shape of gaskets, oven seals, etc., is the curing agent used during the fabrication stage. Generally, in applications in which toughness of the molded organopolysiloxane product is critical, benzoyl peroxide is often preferred. Dicumyl peroxide is utilized more often as a curing agent for making organopolysiloxane elastomers possessing toughness, as well as dimensional stability under periodic or continuous stress at elevated temperatures. However, those skilled in the art know that substantially higher curing temperatures are required to obtain effective results with dicumyl peroxide as compared to benzoyl peroxide. Because of this higher temperature requirement, fabricators often find that molding with dicumyl peroxide is economically less attractive, since molding is usually accomplished by use of high pressure steam. Again, even though both benzoyl peroxide and dicumyl peroxide provide for the production of molded organopolysiloxane elastomeric products having a high degree of toughness, it has been found that the toughness of these products falls off significantly after being heated to an elevated temperature after 24 hours or less.

It would be desirable therefore to be able to make a tough organopolysiloxane elastomer having a satisfactory ability to resist permanent deformation after being compressed at elevated temperatures by molding an organopolysiloxane composition at moderate temperatures, for example, temperatures at about 150 C. or below. In addition, it would also be desirable to produce by such method, an organopolysiloxane elastomer having improved resistance to heat-age.

The term "toughness" as utilized hereinafter with respect to describing the elastomers of the present invention is defined as the product of the tensile strength (p.s.i.), and elongation (percent) of the elastomer. The term "heat-age" is defined as the change in physical properties of the elastomer, such as a loss in tensile or elongation resulting from heating the elastomer to an elevated temperature for an extended period of time. "Compression Set" is the permanent decrease in thickness of a rubber sample which results after the sample has been compressed to a certain predetermined thickness at an elevated temperature over an extended period of time. It is expressed as a percentage of the original deflection.

The present invention is based on the discovery that certain tertiary-alkylperoxyalkylcarbonates are valuable curing agents for molding organopolysilixane compositions to the elastomeric state at temperatures significantly below that required for dicumyl peroxide. In addition, the resulting molded products exhibit superior toughness, ability to resist change in physical properties due to heat-age, and have a low degree of compression set.

The tertiary-alkylperoxyalkylcarbonates that have been found operable in the present invention have the formula, (1)

where R is a monovalent alkyl radical having up to 8 carbon atoms, for example, methyl, ethyl, propyl, isopropyl, butyl, etc. Specific examples of the tertiary-alkylperoxyalkylcarbonates shown in Formula 1 are t-butylperoxyethylcarbonate, t - butylperoxyisopropylcarbonate, t-butylperoxymethylcarbonate, etc.

There is provided by the present invention organopolysiloxane compositions comprising (1) 100 parts of an organopolysiloxane polymer convertible to the cured, solid, elastic state having a viscosity of at least 100,000 centipoises at 25° C. of the formula, (2)
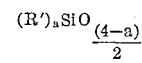

(2) 10 to 300 parts of filler, and (3) 0.001 to 10 parts of a peroxide shown by Formula 1, where R' is a member selected from monovalent hydrocarbon radicals, halogenated monovalent hydrocarbon radicals, and cyanoalkyl radicals, and $a$ is equal to 1.95 to 2.01, inclusive.

Radicals included by R' of Formula 2 are for example, aryl radicals and halogenated aryl radicals, such as phenyl, chlorophenyl, xylyl, tolyl, etc.; aralkyl radicals such as phenylethyl, benzyl, etc.; aliphatic, haloaliphatic, and cycloaliphatic radicals such as alkyl, alkenyl, cycloalkyl, haloalkyl, including methyl, ethyl, vinyl, ally, propyl, chlorobutyl, cyclohexyl, trifluoropropyl, etc.; cyanoalkyl radicals such as cyanoethyl, cyanopropyl, cyanobutyl, etc.

The fillers that are employed in the organopolysiloxane compositions convertible to the cured, solid, elastic state are known to the art as reinforcing and semireinforcing fillers. The reinforcing fillers, such as the silica fillers, including fumed silica, precipitated silica and the like, are structure inducing and depending upon their manufacture, can contain or be free of hydroxyl groups either in the form of adsorbed moisture, or bonded to silicon atoms. These structure inducing fillers can be modified such as, for example, by the introduction of silicon-bonded alkoxy groups or silicon-bonded alkoxy radicals in place of some hydroxy radicals, resulting in certain advantages, such as decreased structure, when incorporated into the organopolysiloxane polymer.

The preferred silica filler of the present invention is fumed silica filler made by fuming processes including the vapor phase burning of silicon tetrachloride or ethylsilicate, an example being what is known to the trade as Cab-O-Sil. Examples of other silica reinforcing fillers may be found described in U.S. Patents 2,541,137, 2,-610,167, and 2,657,149. Such fillers may be slightly acidic or alkaline (that is, have pH's below or above 7) depending upon the method of manufacture. Examples of semireinforcing or usually non-structure forming types, are titanium oxide, lithopone, calcium carbonate, iron oxide, and diatomaceous earth.

The organopolysiloxane polymers of Formula 2 are well known in the art, and are shown, for example, in Agens Patent 2,448,756, Sprung et al. Patent 2,448,556, Sprung Patent 2,484,595, Krieble et al. Patent 2,457,688, Marsden Patent 2,521,528, Hyde Patent 2,490,357, and Warrick Patent 2,541,137. It will, of course, be understood by those skilled in the art that these organopolysiloxane polymers can contain the same or different silicon-bonded organic substituents (e.g., methyl, ethyl, propyl, vinyl, allyl, phenyl, tolyl, xylyl, Benzyl, phenylethyl, naphthyl, chlorophenyl, cyanoethyl, both methyl and phenyl, etc. radicals) connected to the silicon atoms by carbon-silicon linkages.

The polymers can be viscous masses or gummy solids, depending upon the state of condensation of the starting organopolysiloxanes, polymerizing agents, etc., and can be prepared by condensation of a liquid organopolysiloxane containing an average of about 1.95 to 2.01, preferably, from about 1.98 to 2.01 organic groups per silicon atom. The polymerizing agents that can be employed are well known in the art and include for instance, ferric chloride hexahydrate, phenyl phosphoryl chloride; alkaline condensing agents such as potassium hydroxide, sodium hydroxide, etc.

The starting organopolysiloxanes used to make the organopolysiloxane polymers of Formula 2 consists essentially of units of the structural formula $R'_2SiO$, where $R'$ is as previously defined. For example, the organopolysiloxanes of Formula 2 can consist essentially of chemically combined $(CH_3)_2SiO$ units, or a copolymer of dimethylsiloxane with a minor amount (e.g., from 1 to 20 or more mole percent) of chemically combined units such as $(C_6H_5)(CH_3SiO)$, $(C_6H_5)_2SiO$ or $$(NCCH_2CH_2)(CH_3)SiO$$

units or mixtures thereof.

Where alkenyl radicals are attached to silicon by carbon-silicon linkages in the polymers of Formula 2, it is preferable that the alkenyl radicals (for instance, vinyl groups, allyl groups, etc.) be present in an amount equal to from 0.05 to 2 mole percent of the total number of organic radicals in the organopolysiloxane polymer that are attached to silicon through carbon-silicon linkages.

Various other ingredients such as structure additives, pigments, heat stabilizers, etc. for example, that can be utilized are heat stabilizers, such as iron oxide, or aryl urethanes in amounts of up to 4 parts of heat stabilizer per 100 parts of polymer. Structure additives such as silanol-stopped polydiorganosiloxanes for example, polydimethylsiloxanes, alkoxy-stopped polydiorganosiloxanes, diphenylsilanediol, etc., also can be utilized.

The organopolysiloxane compositions of the invention can be made by blending together, such as by milling, doughmixing, etc., the polymer, filler, tertiary-alkylperoxyalkylcarbonate and other ingredients. Preferably the tertiary-alkylperoxyalkylcarbonate is utilized at from .01 to 5 parts per 100 parts of polymer. The order of addition of the various components is not critical. It is preferred, however, to add the tertiary-alkylperoxyalkylcarbonate to the polymer along with or after the filler has been added. If desired, other curing catalysts such as benzoyl peroxide, tertiary-butylperbenzoate, bis-(2,4-dichlorobenzoyl)peroxide, dicumyl peroxide, can be employed along with the tertiary-alkylperoxyalkylcarbonate to achieve special curing effects. Thereafter the organopolysiloxane composition can be molded at pressures from about 100 to 2,000 p.s.i. or more, in combination with temperatures ranging from about 100° C. to 300° C. or higher. Under such conditions, the time required for effecting the desired cure will depend upon such factors as the amount of tertiary-alkylperoxyalkylcarbonate utilized. The nature of the organopolysiloxane polymer, the type and amount of filler, the use desired, etc. Persons skilled in the art will have little difficulty in determining optimum amounts of the materials utilized for particular applications.

In order that those skilled in the art can better understand the practice of the present invention, the following examples are given by way of illustration and not by way of limitation. All parts are by weight.

Example 1

An organopolysiloxane composition was made by milling together 71 parts of an organopolysiloxane polymer having a viscosity of about 50 million centipoises at 25° C., about 2 parts of iron oxide, 23.5 parts of fumed silica, 3.5 parts of a silanol-stopped methylphenylsiloxane having a viscosity of about 15 centipoises at 25° C., and 0.2 part of t-butylperoxyisopropylcarbonate. The organopolysiloxane polymer was chain-stopped with dimethylvinylsiloxy units, and it was composed of a major proportion of dimethylsiloxy units chemically combined with a minor proporation of diphenylsiloxy units and methylvinylsiloxy units.

Other organopolysiloxane compositions were prepared following the same procedure containing from about 0.01 part to about 1 part of t-butylperoxyisopropylcarbonate per 100 parts of organopolysiloxane composition. The various compositions were milled into sheets, and slabs were cut from the respective sheets.

In addition to the above organopolysiloxane compositions, other compositions were prepared in accordance with the same procedure. In place of the t-butylperoxyisopropylcarbonate, there was utilized about 0.8 part of a mixture of equal parts of benzoyl peroxide and a polydimethylsiloxane gum, per 100 parts of the organopolysiloxane composition. Another composition was made in which there was utilized about 0.9 part of a mixture containing dicumyl peroxide and an inert carrier, in which dicumyl peroxide was present at 40% by weight, per 100 parts of the organopolysiloxane composition. Slabs were also formed from these organopolysiloxane compositions following the same procedure.

The various slabs were then molded for 10 minutes at 150° C. The physical properties of the molded slabs were then measured. These molded slabs were then heat-aged for 24 hours at 250° C. The slabs were then measured for compression set after the cured slabs had been heated for 70 hours at about 149° C., while compressed to 75% of their original thickness.

In Table I below, the physical properties of the various slabs are shown after press-cure and heat-age. In the table, "H" is Hardness (Shore A), "T" is Tensile (p.s.i.), "E" is Elongation (percent), and "C.S." is Compression Set (percent). Under Peroxides in the table, BPIC is tertiary-butylperoxyisopropylcarbonate, "Benzoyl" is benzoyl peroxide, and "Dicumyl" is dicumyl peroxide. The parts of peroxide as shown are expressed at 100% concentration.

TABLE I

| Peroxide | Part/100 Parts of Composition | Press-Cure | | | Heat-Age | | | C.S. |
|---|---|---|---|---|---|---|---|---|
| | | H | T | E | H | T | E | |
| BPIC | 0.1 | 40 | 1,525 | 760 | 52 | 1,500 | 590 | |
| | .17 | 44 | 1,570 | 570 | 55 | 1,540 | 470 | |
| | .20 | 45 | 1,490 | 510 | 56 | 1,640 | 470 | 13 |
| | .23 | 46 | 1,590 | 540 | 56 | 1,630 | 440 | |
| | 1 | 48 | 1,440 | 490 | 56 | 1,330 | 410 | 16 |
| Benzoyl | .04 | 45 | 1,683 | 750 | 53 | 1,330 | 520 | |
| Dicumyl | .036 | 50 | 1,470 | 510 | 58 | 1,280 | 380 | 14 |

Example 2

In accordance with the procedure of Example 1, 100 parts of organopolysiloxane composition were made utilizing a trimethylsiloxy chain-stopped polymer having a viscosity of about 50 million centipoises at 25° C., and composed of a major proportion of dimethylsiloxy units chemically combined with a minor proportion of methylvinylsiloxy units. In addition to polymer, fumed silica, and iron oxide, there were utilzer, per 100 parts of the composition, 0.2 part of tertiary-butylperoxyisopropylcarbonate, and 3.5 parts of a silanol-stopped dimethyl oil having a viscosity of about 20 centipoises at 25° C. The organopolysiloxane composition was milled into sheets from which slabs were cut. These slabs were molded, heat-aged and tested for compression set following the procedure of Example 1.

*Example 3*

An organopolysiloxane composition was made by milling together a mixture of 71 parts of a polydimethylsiloxane chain-stopped with trimethylsiloxy units having a viscosity of about 30 million centipoises at 25° C., 24 parts of fumed silica, about 2 parts of iron oxide, and 3 parts of tertiary-butylperoxyisopropylcarbonate. Test slabs were made and tested in accordance with the procedure of Example 1.

In addition to the compositions of Examples 2, and 3, similar organopolysiloxane compositions were prepared following the same procedure respectively except that 0.8 part of dicumyl peroxide, as utilized in Example 1, was substituted for the tertiary-butylisopropylcarbonate.

Table II below shows the data obtained after the various slabs were tested following the procedure of Example 1. In Table II the terms employed are the same as shown in Table I. In addition, the composition of Example 2 is shown as "methylvinyl," and the composition of Example 3 is shown as "dimethyl."

TABLE II

| Peroxide | Parts | Composition (100 Parts) | Press-Cure | | | Heat-Age | | | C.S. |
|---|---|---|---|---|---|---|---|---|---|
| | | | H | T | E | H | T | E | |
| BPIC | 0.2 | Methylvinyl | 56 | 1,250 | 580 | 68 | 1,115 | 320 | 21 |
| | 3 | Dimethyl | 38 | 870 | 550 | 57 | 870 | 220 | 45 |
| Dicumyl | 0.32 | Methylvinyl | 53 | 1,270 | 650 | 68 | 765 | 250 | 24 |

In addition to the results shown in Tables I and II above, it was found that the organopolysiloxane compositions produced in accordance with the practice of the invention as shown in Example 1, containing as little as 0.01 part and 0.02 part of tertiary-butylperoxyisopropylcarbonate per 100 parts of the organopolysiloxane composition, cured satisfactorily. The cured elastomers actually showed improvement in toughness after the heat-age treatment instead of loss in toughness.

In order to further demonstrate the advantages achieved by employing tertiary-alkylperoxyalkylcarbonates in organopolysiloxane compositions convertible to the elastomeric state in accordance with the practice of the invention, there was made a slab of the composition of Example 2. It was press-cured at about 135° C. for 10 minutes and then heat-aged for 24 hours at about 205° C. This press-cure was achieved by the employment of about 30 (p.s.i.) steam pressure. Fabricators skilled in the art know that such conditions are satisfactory for press-curing elastomeric forming organopolysiloxane compositions utilizing benzoyl peroxide; these conditions are insufficient to satisfactorily press-cure such organopolysiloxane compositions utilizing dicumyl peroxide.

In addition to the composition of Example 2 containing 0.2 part of tertiary-butylperoxyisopropylcarbonate per 100 parts of organopolysiloxane composition, slabs were prepared from the same organopolysiloxane composition using benzoyl peroxide in place of tertiary-butylperoxysiopropylcarbonate and other slabs were prepared from the same composition using dicumyl peroxide as the curing agent. Dicumyl peroxide was utilized at 0.32 part per 100 parts of organopolysiloxane composition, and benzoyl peroxide was utilized at 0.4 part per 100 parts of organopolysiloxane composition. These slabs were also press-cured and heat-aged under the same conditions.

Table III shows the results obtained, where the terms employed have the same meaning as employed above.

TABLE III

| Peroxide | Parts | Press-Cure | | | Heat-Age | | |
|---|---|---|---|---|---|---|---|
| | | H | T | E | H | T | E |
| BPIC | 0.2 | 53 | 1,340 | 660 | 67 | 1,610 | 460 |
| Benzoyl | 0.45 | 56 | 1,330 | 520 | 66 | 1,330 | 340 |
| Dicumyl | 0.32 | 25 | 160 | 1,100 | 57 | 640 | 310 |

Based on the results shown in the tables above, those skilled in the art would know that tertiary-alkyl-peroxyalkylcarbonates of the present invention provide for the production of organopolysiloxane compositions convertible to organopolysiloxane elastomers possessing superior toughness and ability to resist change due to heat-age. The organopolysiloxane compositions provided by the present invention also allow for the production of elastomers at unusually low curing temperatures; also, the elastomers produced thereby have superior resistance to permanent set due to compression at elevated temperatures. For example in Table I, elastomers made with tertiary-butylperoxyisopropylcarbonate show an outstanding ability to resist change due to heat-age. In addition, those skilled in the art know that a tensile of over 1600, as shown for example for the organopolysiloxane composition containing 0.2 part of tertiary-butylisopropylcarbonate, is quite unusual for organopolysiloxane compositions of the nature shown in Example 1. Table I also shows the unusually low compression set resulting from the use of the tertiary-butylperoxyisopropylcarbonate as compared to benzoyl and dicumyl peroxide. It also is evident from the results shown in both Table I and Table II, that the organopolysiloxane compositions of the present invention generally resist change due to heat-age to a much greater degree than those organopolysiloxane compositions containing benzoyl peroxide, or dicumyl peroxide. Particularly significant also are the results shown in Table III. This data show that the organopolysiloxane provided by the present invention can be cured at significantly lower temperatures than dicumyl peroxide. Fabricators as a result, will be able to achieve the outstanding cures provided by the use of dicumyl peroxide while utilizing facilities requiring a much lower steam pressure. Alternatively fabricators will also be able to enjoy the advantages of using molding facilities suitable for benzoyl peroxide cures, while producing elastomers having substantially lower compression set.

While the foregoing examples have been limited to only a few of the very many variables within the scope of the present invention, it should be understood that the present invention is directed to the production of a much broader class of organopolysiloxane compositions convertible to the cured, elastomeric state. These organopolysiloxane compositions can be made by blending, or milling together the tertiary-alkylperoxyalkylcarbonates of Formula 1, with the organopolysiloxane polymers of Formula 2, as well as using fillers and other ingredients shown in the foregoing description.

What I claim as new and desire to secure by Letters Patent of the United States is:

1. An organopolysiloxane composition comprising (1)

100 parts of an organopolysiloxane polymer convertible to the cured, solid, elastic state having a viscosity of at least 100,000 centipoises at 25° C. of the formula, $$(R')_a SiO_{\frac{(4-a)}{2}}$$

(2) 10 to 300 parts of filler, and (3) 0.001 to 10 parts of a peroxide having the formula, $$(R)_3 COO\overset{O}{\overset{\|}{C}}OR$$

where R' is a member selected from the class consisting of monovalent hydrocarbon radicals, halogenated monovalent hydrocarbon radicals, and cyanoalkyl radicals, R is a monovalent alkyl radical having up to 8 carbon atoms, and $a$ is equal to 1.95 to 2.01, inclusive.

2. A composition in accordance with claim 1 in which the tertiary-alkylperoxyalkylcarbonate is tertiary-butyl-peroxyisopropylcarbonate.

3. A composition in accordance with claim 1 in which the filler is a silica filler.

4. A composition in accordance with claim 1 in which the polymer consists essentially of chemically combined dimethylsiloxy units, diphenylsiloxy units and methylvinylsiloxy units.

5. A composition in accordance with claim 1 in which the polymer consists essentially of dimethylsiloxy units and methylvinylsiloxy units.

References Cited by the Examiner
UNITED STATES PATENTS 2,374,789  5/1945  Strain _____ 260—610

OTHER REFERENCES

S. Fordham: "Silicones," George Newes Ltd., London 1960. Pages 155–59. 164–69 relied upon.

F. Strain et al.: J. Am. Chemical Society, 72, March 1950; pp. 1254, 1259.

MORRIS LIEBMAN, *Primary Examiner.*

J. E. CALLAGHAN, *Assistant Examiner.*